United States Patent [19]

Nagahama

[11] Patent Number: 4,976,165
[45] Date of Patent: Dec. 11, 1990

[54] BACKLASH REMOVING MECHANISM FOR INDUSTRIAL ROBOT

[75] Inventor: Yasuhide Nagahama, Kamakura, Japan

[73] Assignee: Kabushiki Kaisha Kobe Seiko Sho, Kobe, Japan

[21] Appl. No.: 379,959

[22] Filed: Jul. 14, 1989

[51] Int. Cl.⁵ .................. B25J 17/02; F16H 35/08; F16H 55/20
[52] U.S. Cl. ...................................... 74/400; 74/409; 74/417; 74/479; 901/26; 901/29
[58] Field of Search ............... 74/396, 400, 417, 423, 74/424, 89.13, 479, 409; 901/26, 29

[56] References Cited

U.S. PATENT DOCUMENTS

| | | | |
|---|---|---|---|
| 2,022,290 | 11/1935 | Large | 74/400 X |
| 2,041,180 | 5/1936 | Hodge et al. | 74/400 |
| 2,230,899 | 2/1941 | McGrath | 74/396 X |
| 2,386,946 | 10/1945 | Greiner et al. | 74/400 X |
| 4,233,855 | 11/1980 | Olschewski et al. | 74/396 |
| 4,431,366 | 2/1984 | Inaba et al. | 901/29 X |
| 4,776,232 | 10/1988 | Beyer | 901/29 X |
| 4,787,262 | 11/1988 | Kozawa et al. | 901/29 X |

FOREIGN PATENT DOCUMENTS

| | | | |
|---|---|---|---|
| 60-5309 | 1/1985 | Japan | 74/400 |
| 2076931 | 12/1981 | United Kingdom | 74/400 |

Primary Examiner—Allan D. Herrmann
Attorney, Agent, or Firm—Oblon, Spivak, McClelland, Maier & Neustadt

[57] ABSTRACT

A backlash removing mechanism for an industrial robot wherein operation for adjustment thereof can be made readily with a simplified construction without causing a play. The mechanism comprises a rotational driving means disposed in a casing, a reduction gear for reducing the speed of rotation of the rotational driving means, and a rotary shaft directly coupled at an end thereof to the output side of the reduction gear. The reduction gear is disposed for movement in a direction of an axis of the rotary shaft. A bevel gear mechanism is provided at the other end of the rotary shaft and transmits rotation of the reduced speed from the reduction gear to an output power shaft of the robot. The rotary shaft is supported for rotation by means of a bearing which is disposed for integral movement with the rotary shaft in the axial direction. The bearing is adjustably and securely positioned in the direction of the axis of the rotary shaft in the casing by a positioning mechanism.

3 Claims, 4 Drawing Sheets

BACKLASH REMOVING MECHANISM FOR INDUSTRIAL ROBOT

BACKGROUND OF THE INVENTION

1. Field of the Invention

This invention relates to a backlash removing mechanism for removing backlash of a turning force transmitting system which includes a bevel gear wheel at an articulation section or an arm driving section of an industrial robot.

2. Description of the Prior Art

Generally, occurrence of backlash is a problem where a turning force transmitting system at an articulation section (wrist section or the like) or an arm driving section or the like of an industrial robot cannot employ, as a reduction gear, a reduction gear for a robot wherein the backlash is minimized or else employs a bevel gear mechanism other than a reduction gear in order to change the direction of operation. Particularly, a common gear mechanism involves a large backlash, and accordingly, a special measure is required to remove such a large backlash.

Thus, such a backlash removing mechanism for a rotational mechanical section including a bevel gear mechanism as shown in FIG. 5 is already known.

Referring to FIG. 5, a rotary shaft 41 is supported at an end portion thereof for rotation by means of a bearing 43 and has a bevel gear wheel 42 mounted at the end thereof. A rotational driving means such as a motor not shown is connected to the other end of the rotary shaft 41 so that the latter may be driven to rotate by the former. An output power shaft 44 is disposed perpendicularly to the rotary shaft 41 and supported for rotation by means of a bearing 45. Another bevel gear wheel 46 is mounted at an end of the output power shaft 44 and held in meshing engagement with the bevel gear 42 on the rotary shaft 41. The bevel gear wheel 46 is securely fastened to the output power shaft 44 by means of a plurality of bolts 48 with a liner 47 interposed therebetween for adjustment of a backlash between the bevel gear wheels 42 and 46.

Accordingly, a driving force from the rotational driving means not shown is transmitted to the perpendicularly extending output power shaft 44 by way of the rotary shaft 41 and bevel gear wheels 42 and 46.

In order to remove a possible backlash between the bevel gear wheels 42 and 46 of such a mechanism as described above, at first the bolts 48 are loosened, and then the bevel gear wheel 46 is moved in an axial upward or downward direction in FIG. 5 with respect to the bevel gear wheel 42 to adjust the thickness of the liner 47 or the number of such liners 47 between the bevel gear wheel 46 and the output power shaft 44 until a suitable position of the bevel gear wheel 46 is reached, whereafter the bolts 48 are tightened to secure the bevel gear wheel 46 again to the output power shaft 44.

Since generally the location at which the output power shaft 44 of the robot is to be disposed is determined in advance to a predetermined location and cannot be altered, it is impossible to move the output power shaft 44 itself in its axial direction (in the upward or downward direction in FIG. 5). Therefore, it is necessary to change the relative position of the bevel gear wheel 46 to the output power shaft 44 to adjust a backlash between the bevel gear wheels 42 and 46. Here, it is possible to employ a spline mechanism or a sliding key mechanism in order to fix the bevel gear wheel 46 in the rotational direction to the output power shaft 44 while permitting an axial movement of the bevel gear wheel 46 relative to the output power shaft 44. However, such mechanism is complicated, and besides such mechanism gives rise to another problem that it may probably involve a play.

For the reasons described just above, adjustment of a backlash is conventionally made by means of such a liner or liners 47 as described above.

The conventional backlash removing mechanism for an industrial robot described above, however, is disadvantageous in that much time is required for adjustment in thickness or number of such liner or liners 47 and re-adjustment of a backlash or maintenance of the mechanism due to abrasion of the bevel gear wheels 42 and 46 is cumbersome. Accordingly, improvement of such a conventional backlash removing mechanism as described above is expected.

SUMMARY OF THE INVENTION

It is an object of the present invention to provide a backlash removing mechanism for an industrial robot wherein operation for adjustment thereof can be made readily with a simplified construction without causing play.

In order to attain the object, according to the present invention, there is provided a backlash removing mechanism for an industrial robot which comprises a casing, a rotational driving means disposed in the casing, a reduction gear for reducing the speed of rotation of the rotational driving means, the reduction gear being disposed for movement in a direction of an axis of a shaft which is provided to transmit rotation of a reduced speed, a rotary shaft directly coupled to the output side of the reduction gear and having a gear mechanism provided at the other end thereof for transmitting rotation of the reduced speed to an output power shaft of the robot, a bearing for supporting the rotary shaft for rotation thereon, and a position holding mechanism for holding the bearing at a predetermined position in a direction of an axis of the rotary shaft.

With the backlash removing mechanism for an industrial robot, the position of the gear mechanism for transmitting rotation of the rotary shaft to the output power shaft is adjusted by adjusting the rotary shaft in the direction of the axis of the rotary shaft together with the bearing and holding the bearing and the rotary shaft at the thus adjusted individual axial positions by means of the position holding mechanism. Consequently, a possible backlash in the gear mechanism between the rotary shaft and the output power shaft can be suitably adjusted or removed very readily. Besides, since the structure of the backlash removing mechanism is simple, such effects are attained that economy of parts can be attained and that occurrence of play which may possibly be caused by use of additional parts can be prevented.

The above and other objects, features and advantages of the present invention will become apparent from the following description and the appended claims, taken in conjunction with the accompanying drawings.

DETAILED DESCRIPTION OF THE PREFERRED EMBODIMENT

Figure 1:
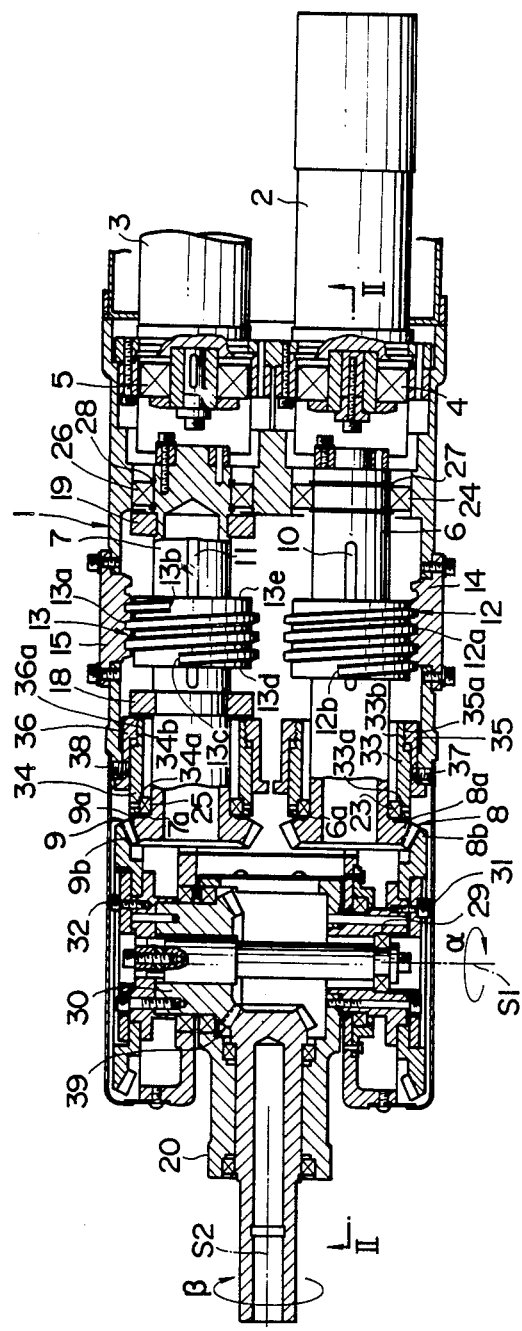
FIG. 1 is an axial sectional view of an articulation section of an industrial robot in which a backlash removing mechanism according to the present invention is incorporated (or a sectional view taken along line I—I of FIG. 2)
Figure 2:
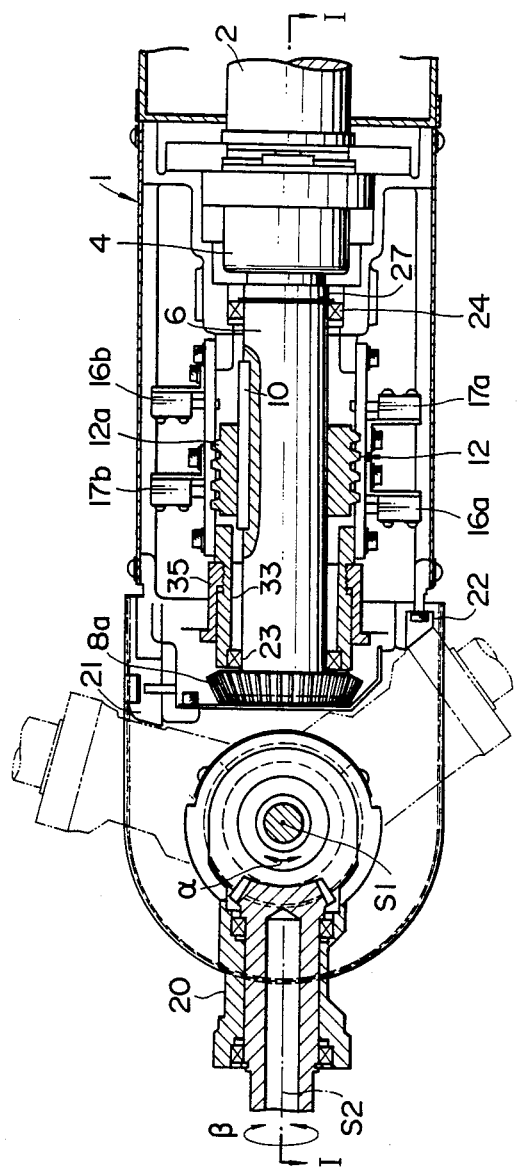
FIG. 2 is a sectional view taken along line II—II of FIG. 1.

Referring first to FIGS. 1 and 2, there is shown an articulation section of an industrial robot in which a backlash removing mechanism according to the present invention is incorporated, together with a driving mechanism for the articulation section. The industrial robot here is a manipulator such as an arc welding robot. The articulation section of the industrial robot is in the form of a two-axes robot wrist section 20 which has a degree of bending freedom $\alpha$ (with an operational angular range of less than 360 degrees) around an axis S1 and a degree of twisting freedom $\beta$ (with an operational angular range of greater than 360 degrees) around the other axis S2.

A pair of drive motors (rotational driving means) 2 and 3 for individually driving the two axes to rotate are disposed in a casing of a robot arm. A pair of rotary shafts 6 and 7 are connected to the drive motors 2 and 3 by way of a pair of reduction gears (harmonic reduction gears such as those shown in U.S. Pat. No. 4,431,366, or cyclone reduction gears) 4 and 5, respectively. The rotary shafts 6 and 7 are individually coupled at one ends thereof directly to the reduction gears 4 and 5 by means of screws, respectively. The reduction gears 4 and 5 employed here are of the type which can be moved in the axial directions of the rotary shafts 6 and 7, respectively, and the rotary shafts 6 and 7 directly coupled to the reduction gears 4 and 5 are also disposed for movement in the axial directions.

A driving force transmitted from the corresponding drive motor 2 or 3 to the rotary shaft 6 or 7 is then transmitted to a rotary shaft (output power shaft) 29 or 30 by way of a bevel gear mechanism 8 or 9, and rotation of the rotary shaft 29 is transmitted as rotation of the wrist section 20 around the axis S1 while rotation of the rotary shaft 30 is transmitted as rotation of the wrist section 20 around the axis S2 at a reduced speed by a bevel gear mechanism 8 or 9.

Each of the bevel gear mechanisms 8 and 9 is composed of a bevel gear wheel 8a or 9a formed at the other end of the rotary shaft 6 or 7, respectively, and another bevel gear wheel 8b or 9b mounted at an end of the rotary shaft 29 or 30 by means of a bolt 31 or 32 and held in meshing engagement with the bevel gear wheel 8a or 9a.

Each of the rotary shafts 6 and 7 is supported at the opposite ends thereof for rotation on the casing 1 by means of a pair of bearings 23, 24 and 25, 26, respectively.

The inner races of the first bearings 24 and 26 are secured to the rotary shafts 6 and 7 by means of retaining rings 27 and 28, respectively, while their outer races are not restricted from movement in the axial directions (in the leftward or rightward direction in FIGS. 1 and 2) relative the casing 1. Accordingly, the bearings 24 and 26 themselves can move in the axial directions together with the rotary shafts 6 and 7, respectively.

The second bearings 23 and 25 are interposed between outer circumferential faces of the rotary shafts 6 and 7 and inner circumferential faces of a pair of bearing cases 33 and 34 loosely fitted on the rotary shafts 6 and 7, respectively. The inner races of the bearings 23 and 25 are restricted from moving in a direction to reduce a backlash by stepped portions 6a and 7a formed on the outer circumferential faces of the rotary shafts 6 and 7, respectively, while the outer races of the bearings 23 and 25 are restricted from movement in a direction to increase a backlash by stepped portions 33a and 34a formed on the inner circumferential faces of the bearing faces 33 and 34, respectively.

A pair of adjustment cases 35 and 36 are secured to the casing and fitted on the bearing cases 33 and 34, respectively. In particular, threaded portions 35a and 36a formed on inner circumferential faces of the adjustment cases 35 and 36 are held in threaded engagement with threaded portions 33b and 34b formed on the outer circumferential faces of the bearing cases 33 and 34, respectively, so that the bearing cases 33 and 34 can be rotated and moved in the axial directions relative to the adjustment cases 35 and 36, respectively.

A pair of set screws 37 and 38 are screwed in the adjustment cases 35 and 36 for contacting with and pressing against the outer circumferential faces of the bearing cases 33 and 34 to hold the bearings 23 and 25 and the rotary shafts 6 and 7 to predetermined axial positions.

A pair of position holding mechanisms for the rotary shafts 6 and 7 are thus constituted from the bearing cases 33 and 34, adjustment cases 35 and 36 and set screws 37 and 38, respectively, and a backlash removing mechanism of the present embodiment is constituted from one of the position holding mechanisms and the corresponding bearing 24 or 26.

A sliding key 10 or 11 is provided in and extends axially along each of the rotary shafts 6 and 7 within the casing 1, respectively, and a male screw member 12 or 13 is fitted for axial sliding movement on each of the rotary shafts 6 and 7. The male screw members 12 and 13 are held in engagement with the sliding keys 10 and 11 so that they may be rotated in an integral relationship with (without making rotation relative to) but moved in the axial directions on the rotary shafts 6 and 7, respectively.

Figure 3:
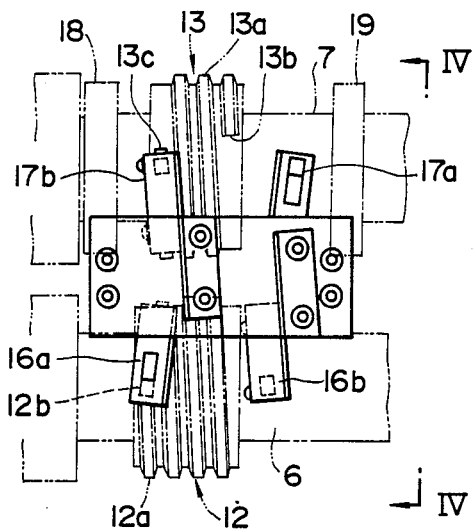
FIG. 3 is a plan view showing limit switches at the articulation section shown in FIG. 1.
Figure 4:
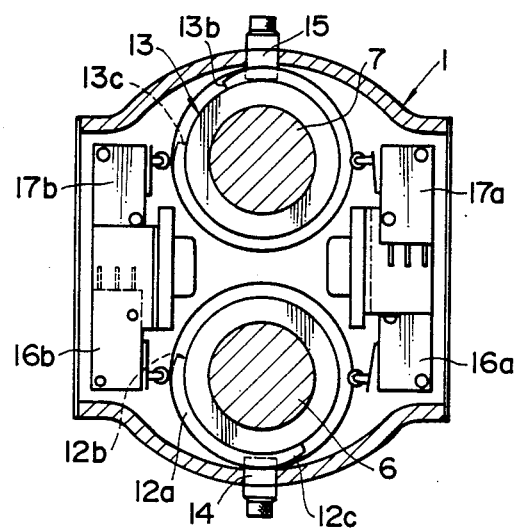
FIG. 4 is a sectional view taken along line IV—IV of FIG. 3.
Figure 5:
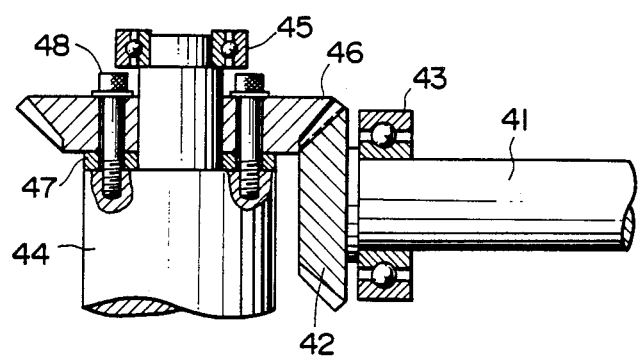
FIG. 5 is a schematic sectional view showing a conventional backlash removing mechanism for an industrial robot.

A pair of fixed guides 14 and 15 for guiding the male screw members 12 and 13 are mounted on the casing 1 on the outer sides of the male screw members 12 and 13, respectively. The fixed guides 14 and 15 serve as part of nuts or racks for threaded engagement with screw threads 12a and 13a on the outer peripheries of the male screw members 12 and 13, respectively. The male screw members 12 and 13 are thus moved in the axial directions along the sliding keys 10 and 11 while being rotated together with the rotary shafts 6 and 7 under the guidance of the fixed guides 14 and 15 held in engagement with the male screw members 12 and 13, respectively. As shown in FIGS. 2 to 4, two pairs of limit switches 16a, 16b and 17a, 17b are provided which are operated by the male screw members 12 and 13, when the male screw members 12 and 13 are moved to predetermined positions, to detect the rotational positions of the rotary shafts 6 and 7, respectively. The limit switches 16a and 16b are located for contact with and operation by the opposite end faces 12b and 12c of the screw thread 12a of the male screw member 12, respectively, while the limit switches 17a and 17b are located for contact with and operation by the opposite end faces 13b and 13c of the screw thread 13a of the male screw member 13, respectively.

As shown in FIG. 1, a pair of stopper members 18 and 19 made of a rubber material are fitted at opposite end portions of the rotary shaft 7 axially outwardly of the limit switches 17a and 17b, respectively, that is, at predetermined axial positions which define the opposite limit positions for axial movement of the male screw member 13, thereby forming a mechanical stopper mechanism for the wrist section 20 against movement around the axis S2. The stopper members 18 and 19 are disposed for contact with the opposite axial end faces 13d and 13e of the male screw member 13 to mechanically restrict axial movement of the male screw member 13 and mechanically restrict further rotation of the rotary shaft 7 at the individual limit positions. To the contrary, no such stopper members as described just above are provided for the rotary shaft 6. Rotation of the rotary shaft 6, however, is mechanically restricted as the wrist section 20 is contacted with and stopped by either of a pair of rubber stoppers 21 and 22 mounted on the casing 1.

With the backlash removing mechanism for an industrial robot of the embodiment of the present invention having such a construction as described above, in order to remove a backlash between the bevel gear wheels 8a and 8b or 9a and 9b, at first the set screw 37 or 38 is loosened, and the bearing case 33 or 34 itself is rotated to loosen the screwed condition thereof in the adjustment case 35 or 36 and move in the axial direction (in the leftward direction in FIG. 1 or 2).

When the bearing case 33 or 34 is moved in the axial direction, the rotary shaft 6 or 7 is moved in the same direction by way of the bearing 23 or 25 which is restricted in position by the bearing case 33 or 34 and the rotary shaft 6 or 7. In this instance, since the reduction gear 4 or 5 employed can be moved in the axial direction and the bearing 24 or 26 is disposed for movement in the axial direction relative to the casing 1 as described hereinabove, the entire rotary shaft 6 or 7 is moved in the axial direction together with the bearings 23 and 24 or 25 and 26 without trouble.

After the rotary shaft 6 or 7 is thus moved in the axial direction to a predetermined axial position, the set screw 37 or 38 is tightened. Consequently, relative rotation of the bearing case 33 or 34 to the adjustment case 35 or 36, and hence axial movement of the rotary shaft 6 or 7 is restricted, and the rotary shaft 6 or 7 is held at the predetermined axial position. At the predetermined axial position of the rotary shaft 6 or 7, the bevel gear wheel 8a or 9a on the rotary shaft 6 or 7 is in an adjusted condition in position with respect to the bevel gear wheel 8b or 9b on the rotary shaft 29 or 30 with the backlash between the bevel gear wheels 8a and 8b or 9a and 9b suitably adjusted or removed.

It is to be noted that, when the rotary shaft 6 or 7 is driven to rotate by the drive motor 2 or 3, the male screw member 12 or 13 is moved in the axial direction while being rotated in an integral relationship with the rotary shaft 6 or 7. Then, when the male screw member 12 is rotated by a predetermined number of rotations until one of the predetermined axial positions is reached, the end face 12b or 12c of the screw thread 12a thereof is contacted with and operates the limit switch 16a or 16b so that the limit switch 16a or 16b detects the limit position of the rotary shaft 6. To the contrary, when the male screw member 13 is rotated, the limit switch 17a or 17b is operated similarly so that it detects one of the limit positions of the rotary shaft 7. When one of the limit switches 16a, 16b and 17a, 17b is operated in this manner, normally the operation of the motor 2 or 3 is stopped to stop rotation of the rotary shaft 6 or 7. Consequently, rotation of the wrist section 20 around the axis S1 or S2 is stopped at a predetermined position of the wrist section 20.

To the contrary, if none of the limit switches 16a, 16b and 17a, 17b should be operated due to an electric failure, in the case of the rotary shaft 7, the end face 13d or 13e of the male screw member 13 is contacted with and stopped by the stopper member 18 or 19 to absorb an impact force upon the rotary shaft 7 and restrict further movement of the male screw member 13 while further integral rotation of the rotary shaft 7 with the male screw member 13 is also restricted. To the contrary, in the case of the rotary shaft 6, an end face of the wrist section 20 is contacted with and stopped by the stopper 21 or 22 provided at a suitable location on the casing, and consequently, further rotation of the rotary shaft 6 is restricted and further rotation of the wrist section 20 around the axis S1 is mechanically restricted at one of the predetermined limit positions.

In this manner, according to the present embodiment, if the rotary shaft 6 or 7 directly coupled to the reduction gear 4 or 5 is moved in the axial direction by way of the bearing case 33 or 34 and the adjustment case 35 or 36 making use of a tolerance of the reduction gear 4 or 5 in the axial direction and then it is held at the predetermined axial position by means of the set screw 37 or 38, then a backlash between the bevel gear wheels 8a and 8b or 9a and 9b is adjusted (or re-adjusted for maintenance) or removed very readily comparing with a backlash removing operation in a conventional backlash removing mechanism of the liner type. Further, since the structure is simple, economy of parts is attained and occurrence of a new play which may possibly be caused by use of additional parts can be prevented.

It is to be noted that while in the embodiment described above a mechanism according to the present invention is described applied to the wrist section 20 of the robot, the present invention is not limited to the specific arrangement and can be applied similarly to any other articulation section which has a similar construction.

Having now fully described the invention, it will be apparent to one of ordinary skill in the art that many changes and modifications can be made thereto without departing from the spirit and scope of the invention as set forth herein.

What is claimed is:

1. A backlash removing mechanism for an industrial robot, comprising:
    a casing:
    a rotational driving means disposed in said casing;
    a reduction gear for reducing the speed of rotation of said rotational driving means;
    a rotary shaft directly coupled at an end thereof to the output side of said reduction gear, said reduction gear being disposed for movement in a direction of an axis of said rotary shaft;
    a gear mechanism provided at the other end of said rotary shaft for transmitting rotation of the reduced speed from said reduction gear to an output power shaft of said robot;

a first bearing for supporting said rotary shaft for rotation thereon, said first bearing being slidably disposed on said casing for integral movement with said rotary shaft in the direction of the axis of said rotary shaft;

a second bearing fitted on said shaft; and positioning means for adjustably and securely positioning said second bearing in the direction of the axis of said rotary shaft on said casing.

2. The mechanism of claim 1 wherein said positioning means includes an axially adjustable bearing case on which outer race of said second bearing is mounted.

3. The mechanism of claim 2 wherein an inner race of said second bearing is restricted from moving in a direction to reduce backlash by a stepped portion of said rotary shaft, and wherein the outer race of said second bearing is restricted from moving in a direction to increase backlash by a stepped portion of said bearing case.

* * * * *